(12) United States Patent
Bhakta et al.

(10) Patent No.: US 12,105,287 B1
(45) Date of Patent: Oct. 1, 2024

(54) OPTICAL SYSTEMS FOR LEVERAGING THE NON-ZERO TRANSITION TIME OF DISPLAY PANEL MIRRORS

(71) Applicant: Apple Inc., Cupertino, CA (US)

(72) Inventors: Vikrant Bhakta, Santa Clara, CA (US); Guolin Peng, Sunnyvale, CA (US); Hyungryul Choi, San Jose, CA (US); Scott M. DeLapp, San Diego, CA (US)

(73) Assignee: Apple Inc., Cupertino, CA (US)

( * ) Notice: Subject to any disclaimer, the term of this patent is extended or adjusted under 35 U.S.C. 154(b) by 714 days.

(21) Appl. No.: 17/373,190

(22) Filed: Jul. 12, 2021

Related U.S. Application Data

(60) Provisional application No. 63/051,325, filed on Jul. 13, 2020.

(51) Int. Cl.
*G02B 26/00* (2006.01)
*F21V 8/00* (2006.01)
*G02B 5/18* (2006.01)
*G02B 26/08* (2006.01)
*G02B 27/00* (2006.01)
*G02B 27/01* (2006.01)

(52) U.S. Cl.
CPC ....... *G02B 27/0172* (2013.01); *G02B 6/0016* (2013.01); *G02B 6/003* (2013.01); *G02B 26/0833* (2013.01); *G02B 27/0081* (2013.01); *G02B 2027/014* (2013.01)

(58) Field of Classification Search
CPC .. G02B 27/0172; G02B 6/0016; G02B 6/003; G02B 26/0833; G02B 27/0081; G02B 2027/014
USPC .......................................................... 359/223
See application file for complete search history.

(56) References Cited

U.S. PATENT DOCUMENTS

| | | | |
|---|---|---|---|
| 6,819,469 B1 * | 11/2004 | Koba ....................... | G03H 1/02 359/290 |
| 10,866,426 B2 | 12/2020 | Hansotte et al. | |
| 11,009,707 B2 | 5/2021 | Peng et al. | |
| 2020/0004020 A1 | 1/2020 | Bhakta et al. | |

* cited by examiner

*Primary Examiner* — Joseph P Martinez
*Assistant Examiner* — Grant A Gagnon
(74) *Attorney, Agent, or Firm* — Treyz Law Group, P.C.; Michael H. Lyons

(57) ABSTRACT

A display having a reflective display panel may provide image light to an eye box. The panel may include mirrors rotatable between first and second angles. The mirrors may take a non-zero time period to transition between the first and second angles. During the non-zero time period, the light source may emit pulses of illumination. The mirrors may reflect the pulses of illumination as offset pupils of image light. The mirrors may be at respective intermediate angles while reflecting each of the pulses of illumination. The mirrors may toggle between the first and second angles at a sufficiently fast rate such that the offset pupils form an effective pupil that is expanded in at least one dimension. If desired, the offset pupils may be used to display virtual objects in different focal planes at the eye box.

28 Claims, 10 Drawing Sheets

OPTICAL SYSTEMS FOR LEVERAGING THE NON-ZERO TRANSITION TIME OF DISPLAY PANEL MIRRORS

This application claims the benefit of U.S. Provisional Patent Application No. 63/051,325, filed Jul. 13, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module and a waveguide. The display module may include a light source and a reflective display panel. The reflective display panel may be a digital-micromirror device (DMD) panel. The DMD panel may include micromirrors rotatable between an "OFF" state in which the micromirrors are oriented at a first tilt angle and an "ON" state in which the micromirrors are oriented at a second tilt angle. The control circuitry may control at least one of the micromirrors to rotate between the first and second tilt angles. The micromirror may take a non-zero time period to transition between the first and second tilt angles. During the non-zero time period, the control circuitry may control the light source to emit pulses of illumination light. The mirror may reflect the pulses of illumination light as offset pupils of image light. The mirror may be at a respective intermediate tilt angle while reflecting each of the pulses of illumination light. The control circuitry may toggle the mirror between the first and second tilt angles at a sufficiently fast rate such that the offset pupils form an effective pupil that is expanded in at least one dimension.

An input coupler may couple the image light into the waveguide. An output coupler may couple the image light out of the waveguide and towards an eye box. If desired, the waveguide may include stacked layers. The input coupler may include different input coupling structures in each of the layers. Each input coupling structure may couple a respective one of the pupils of image light into the waveguide. The output coupler may include different output coupling structures in each of the layers. Each output coupling structure may couple the image light from a respective one of the input coupling structures out of the waveguide. If desired, each output coupling structure may impart a different respective optical power to the image light. In this way, by leveraging the non-zero time period required by the mirrors to rotate between the first and second tilt angles, the display may provide effectively expanded pupils of image light and/or virtual objects in different focal planes at the eye box. Performing pupil expansion using the intermediate tilt angles may allow other pupil expanding components such as a cross-coupler to be omitted from the waveguide. Omitting the cross-coupler may minimize the number of diffractions performed on the image light, thereby maximizing throughput and brightness of the image light at the eye box.

DETAILED DESCRIPTION

Figure 1:
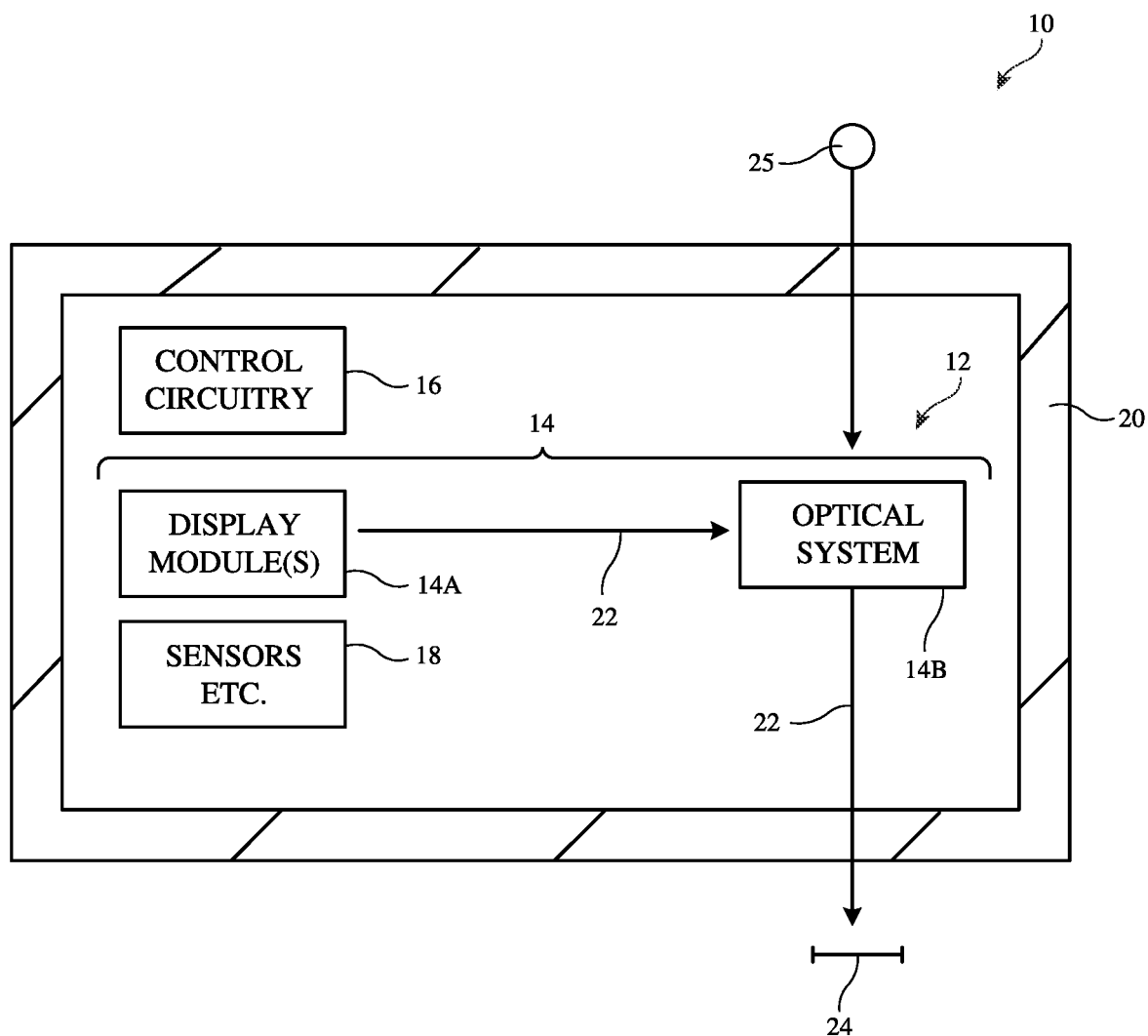
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
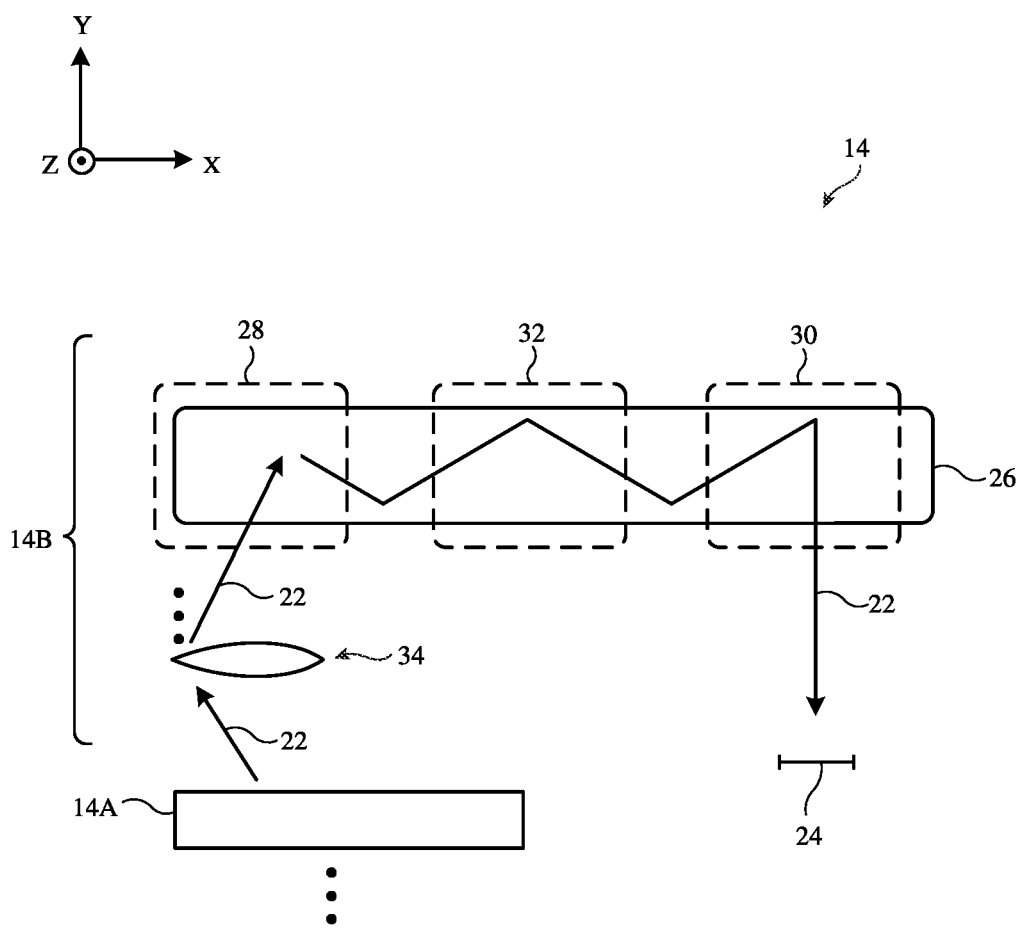
FIG. 2 is a top view of an illustrative optical system for a display having a waveguide with an input coupler that receives light from a display module in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module(s) 14A may generate image light 22 associated with image content to be displayed to eye box 24. Image light 22 may be collimated using a lens such as collimating lens 34. Optical system 14B may be used to present image light 22 output from display module(s) 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26, whereas output coupler 30 may be configured to couple image light 22 from within waveguide 26 to the exterior of waveguide 26 and towards eye box 24. Input coupler 28 may include an input coupling prism if desired. As an example, display module(s) 14A may emit image light 22 in the +Y direction towards optical system 14B. When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30) or one or more layers of diffractive grating structures.

Figure 3:
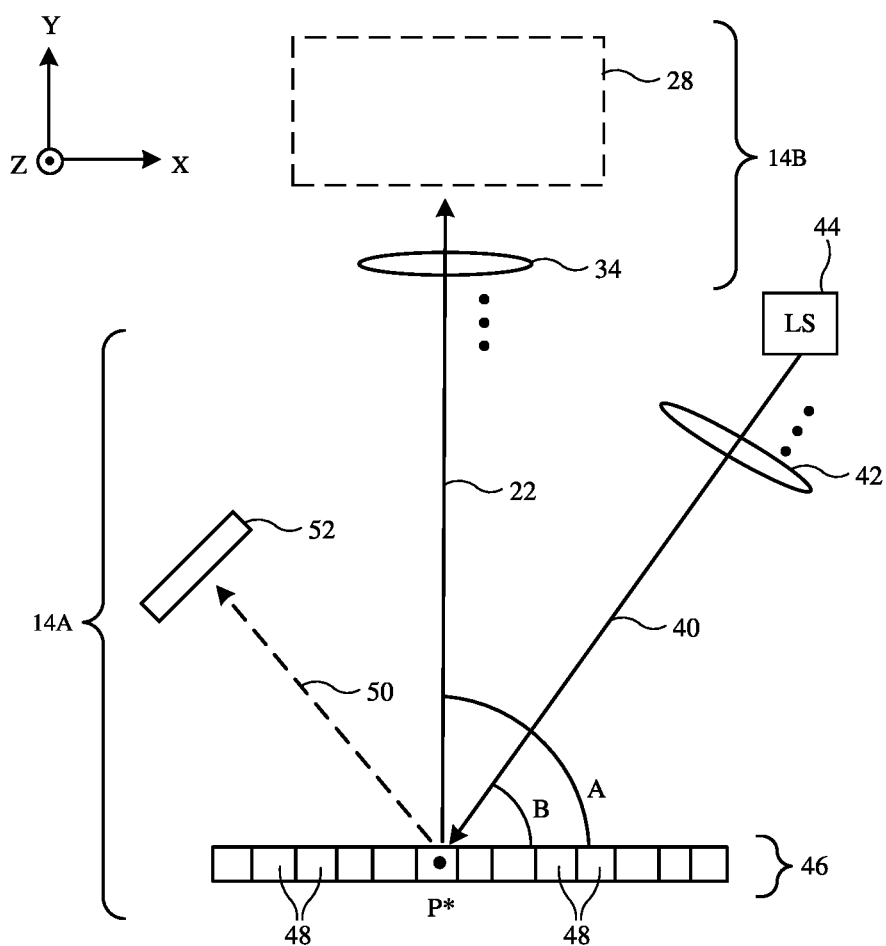
FIG. 3 is a top view of an illustrative display module having a reflective display panel in accordance with some embodiments.

In one suitable arrangement that is described herein as an example, display module 14A may include a reflective display panel for providing image light 22 to waveguide 26. FIG. 3 is a top view showing how display module 14A may include a reflective display panel for providing image light 22 to waveguide 26. As shown in FIG. 3, display module 14A may include a light source (LS) such as light source 44. Light source 44 may be an LED light source, OLED light source, uLED light source, laser light source, or any other desired light source.

Display module 14A may include a reflective display panel such as reflective display panel 46 (e.g., a reflective spatial light modulator). Reflective display panel 46 may be an LCOS display panel, a DMD display panel, or other types of reflective display panel. Reflective display panel 46 may have an array of individually adjustable pixels. Each pixel may be formed by a respective reflective element 48 in reflective display panel 46. In one suitable arrangement that is described herein as an example, reflective display panel 46 is a DMD display panel. Reflective display panel 46 may therefore sometimes be referred to herein as DMD panel 46 or DMD 46. In this example, reflective elements 48 may be mirrors such as micromirrors (e.g., micro-electromechanical-systems (MEMS)-based micromirrors). Reflective elements 48 may therefore sometimes be referred to herein as micromirrors 48 or mirrors 48. Each mirror 48 may form a respective pixel for reflective display panel 46.

Light source 44 may emit illumination light 40. Illumination light 40 may include light in one or more wavelength bands (e.g., red, green, and/or blue wavelength bands). One or more illumination light lens elements 42 in display module 14A may direct illumination light 40 onto reflective display panel 46. Lens elements 42 may include one or more prisms, partial reflectors, polarizers, and/or other optical components if desired. Lens elements 42 may, for example, provide illumination light 40 to DMD panel 46 at an incident angle B (relative to the X-axis) across each of the mirrors 48 in DMD panel 46. During operation, control circuitry 16 (FIG. 1) may control DMD panel 46 to selectively reflect illumination light 40 at each pixel (mirror) location to produce image light 22 (e.g., image light having an image as modulated onto the illumination light by the mirrors 48 in DMD panel 46).

For example, mirrors 48 may be individually (e.g., independently) rotatable between two predetermined orientations (states) such as an "ON" state and an "OFF" state.

Control circuitry 16 of FIG. 1 may individually adjust the state of each pixel based on the images to be displayed using display 14. The example of FIG. 3 illustrates the operation of a single pixel P* on illumination light 40 for the sake of clarity. However, in general, similar operations are performed at each pixel (mirror) across the lateral area of DMD panel 46. DMD panel 46 may include any desired number of pixels arranged into rows and columns or in any other desired pattern (e.g., tens of pixels, hundreds of pixels, thousands of pixels, tens of thousands of pixels, hundreds of thousands of pixels, etc.).

When pixel P* is in the "ON" state, the mirror 48 used to form that pixel P* may be at a first orientation (e.g., an "ON" orientation or state). In this orientation, mirror 48 may reflect illumination light 40 (as image light 22) at an output angle A towards lens 34. Lens 34 may direct image light 22 towards input coupler 28 of optical system 14B. When pixel P* is in the "OFF" state, pixel P* may direct illumination light 40 away from optical system 14B, as shown by arrow 50 (e.g., towards a light sink 52 such as a baffle that includes light absorbing materials and/or textured structures that effectively extinguish the reflected light to prevent the reflected light from being received at the eye box). By adjusting pixel P* between the "ON" and "OFF" states in this way, pixel P* may either direct illumination light 40 towards input coupler 28 and the eye box (as image light 22) or may direct illumination light 40 outside of the projection optics (i.e., towards light sink 52) so that the beam is not received at the eye box.

Figure 4:
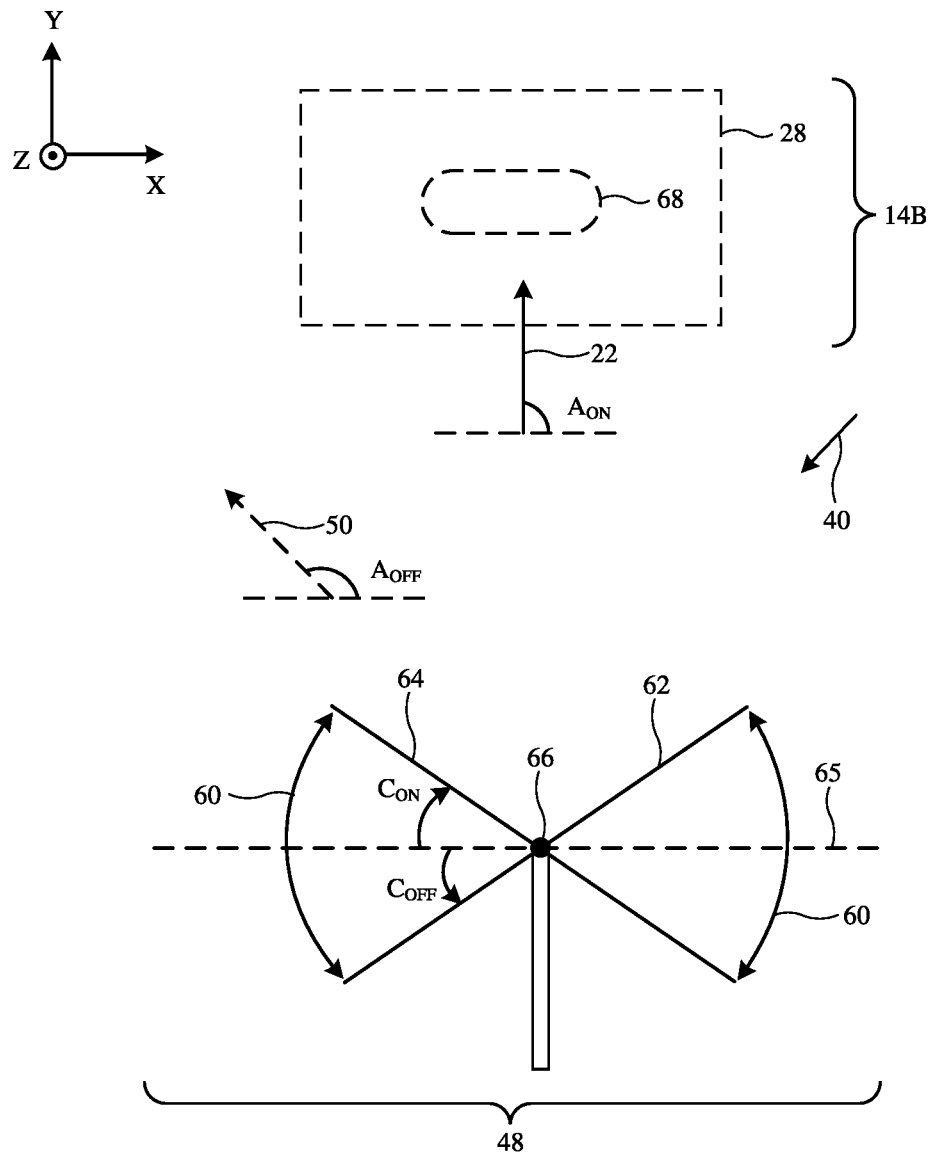
FIG. 4 is a schematic diagram of an illustrative reflective display panel mirror that transitions between ON and OFF states in accordance with some embodiments.

FIG. 4 is a schematic diagram of a given mirror 48 in DMD panel 46 (e.g., the mirror 48 that is used to form pixel P* of FIG. 3). As shown in FIG. 4, mirror 48 may be adjustable (rotatable) about a pivot point 66. Pivot point 66 may be located at the center of mirror 48, at an end (edge) of mirror 48, elsewhere on mirror 48, or mirror 48 may be rotatable about multiple pivot points.

The orientation (position) of mirror 48 may be defined by a tilt angle C (e.g., with respect to horizontal axis 65). Control circuitry 16 (FIG. 1) may adjust mirror 48 between the "ON" state and the "OFF" state, as shown by arrows 60. In the "ON" state, the (mirror) plane of mirror 48 may be at orientation 64 (e.g., an orientation in which the mirror plane is oriented at tilt angle $C_{ON}$). When in this state, mirror 48 may reflect illumination light 40, as image light 22, onto an output (reflected) angle A such as output angle $A_{ON}$ (e.g., as measured with respect to horizontal axis 65). Image light 22 output from mirror 48 at output angle $A_{ON}$ may be directed towards (e.g., focused onto) input coupler 28 (e.g., by lens 34 of FIG. 3). For example, the image light 22 reflected by mirror 48 may be focused onto input coupler 28 within a corresponding pupil 68. Pupil 68 may extend across a finite non-zero area.

In the "OFF" state, mirror 48 may be at orientation 62 (e.g., an orientation in which the mirror plane is oriented at tilt angle $C_{OFF}$). Tilt angle $C_{OFF}$ may be less than zero whereas tilt angle $C_{ON}$ is greater than zero. This is merely illustrative. In another suitable arrangement, tilt angle $C_{OFF}$ may be equal to zero or greater than zero and less than tilt angle $C_{ON}$. Tilt angles $C_{ON}$ and $C_{OFF}$ may be the limits of the range of rotation achievable by mirror 48 (e.g., tilt angle $C_{ON}$ may be the maximum tilt angle of mirror 48 and tilt angle $C_{OFF}$ may be the minimum tilt angle of mirror 48). When in the "OFF" state, mirror 48 may reflect illumination light 40 onto an output (reflected) angle A such as output angle $A_{OFF}$, as shown by arrow 50. The light reflected at output angle $A_{OFF}$ may be directed towards light sink 52 of FIG. 3, for example.

Over time, control circuitry 16 (FIG. 1) may toggle mirror 48 between orientations 62 and 64, as shown by arrows 60 (e.g., as the pixel P* formed by mirror 48 is toggled on or off to produce images such as images from a stream of image frames at the eye box). As an example, tilt angle $C_{ON}$ may be 12 degrees, 15 degrees, between 10 and 15 degrees, between 11 and 13 degrees, 5 degrees, between 5 and 15 degrees, greater than 10 degrees, greater than 5 degrees, etc. Tilt angle $C_{OFF}$ may be −12 degrees, −15 degrees, between −10 and −15 degrees, between −11 and −13 degrees, −5 degrees, between −5 and −15 degrees, less than −10 degrees, less than −5 degrees, 0 degrees, 2 degrees, less than 5 degrees, between −12 and 0 degrees, or any other desired angle less than tilt angle $C_{ON}$.

Figure 5:
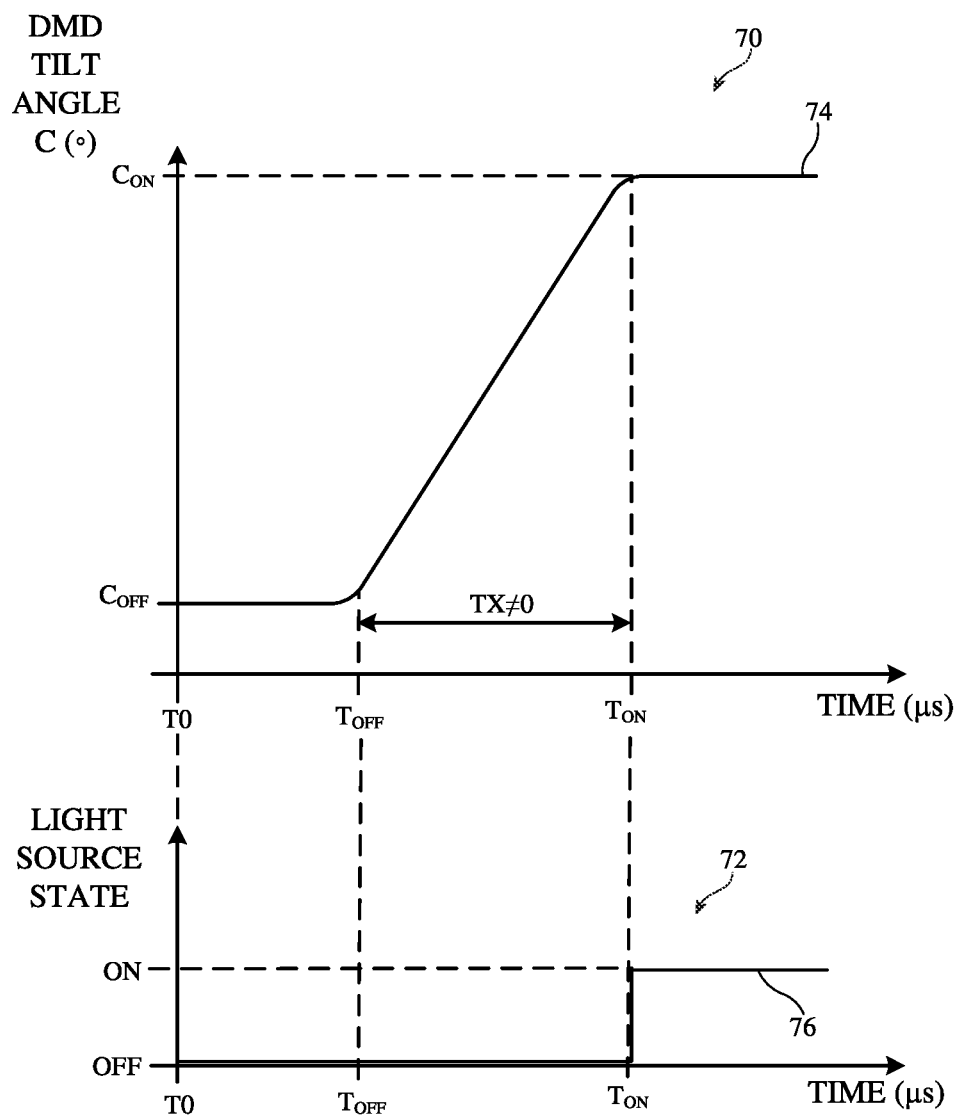
FIG. 5 includes graphs that show how an illustrative light source may be synchronized with a reflective display panel mirror that transitions between ON and OFF states in accordance with some embodiments.

In practice, it takes a non-zero amount of time to rotate mirror 48 between tilt angles $C_{OFF}$ and $C_{ON}$ (e.g., between orientations 64 and 62). Graph 70 of FIG. 5 plots the tilt angle C of mirror 48 as the mirror transitions from orientation 62 (tilt angle $C_{OFF}$) to orientation 64 (tilt angle $C_{ON}$) of FIG. 4 over time (e.g., on a microsecond (μs) scale). As shown by curve 74 of graph 70, mirror 48 may be at tilt angle $C_{OFF}$ between time T0 and time $T_{OFF}$. At time $T_{OFF}$, control circuitry 16 (FIG. 1) may control mirror 48 to rotate to tilt angle $C_{ON}$. At and after time $T_{ON}$, mirror 48 may be at tilt angle $C_{ON}$. Between times $T_{OFF}$ and $T_{ON}$, mirror 48 may rotate through intermediate tilt angles as mirror 48 transitions from tilt angle $C_{OFF}$ to tilt angle $C_{ON}$. It may take mirror 48 a non-zero transition time (period) TX (e.g., where $TX = T_{ON} - T_{OFF}$) to rotate from tilt angle $C_{OFF}$ to tilt angle $C_{ON}$ (e.g., curve 70 may have a non-vertical slope between times $T_{OFF}$ and $T_{ON}$).

In order to mitigate stray light in the system, light source 44 (FIG. 3) may be in an "OFF" state until mirror 48 has arrived at tilt angle $C_{ON}$. Graph 72 of FIG. 5 plots the state of light source 44 as mirror 48 transitions between tilt angle $C_{OFF}$ and tilt angle $C_{ON}$ over time. As shown by curve 76 of graph 72, light source 44 may be turned off until time $T_{ON}$ (e.g., light source 44 may not emit illumination light 40 between times T0 and $T_{ON}$). At time $T_{ON}$, light source 44 may be turned on (e.g., placed in an "ON" state) to emit illumination light 40. The illumination light 40 may then reflect off of mirror 48 (which is at tilt angle $C_{ON}$ at time $T_{ON}$) as image light 22 provided to input coupler 28.

While graph 70 and graph 72 of FIG. 5 plot the transition of mirror 48 from the "OFF" state to the "ON" state, similar graphs may also plot the transition of mirror 48 from the "ON" state to the "OFF" state (e.g., by reversing the time axes of graphs 70 and 72). Control circuitry 16 may toggle in both directions between the "ON" and "OFF" states over time (e.g., as shown by arrows 60 of FIG. 4). If desired, the flexibility and performance of the display may be enhanced by leveraging the fact that mirror 48 has a non-zero transition time TX as the mirror transitions between "ON" and "OFF" states. For example, mirror 48 may be used to reflect light towards input coupler 28 while mirror 48 is oriented at one or more intermediate tilt angles between tilt angles $C_{OFF}$ and $C_{ON}$ (e.g., as the mirror transitions between tilt angles $C_{OFF}$ and $C_{ON}$).

Figure 6:
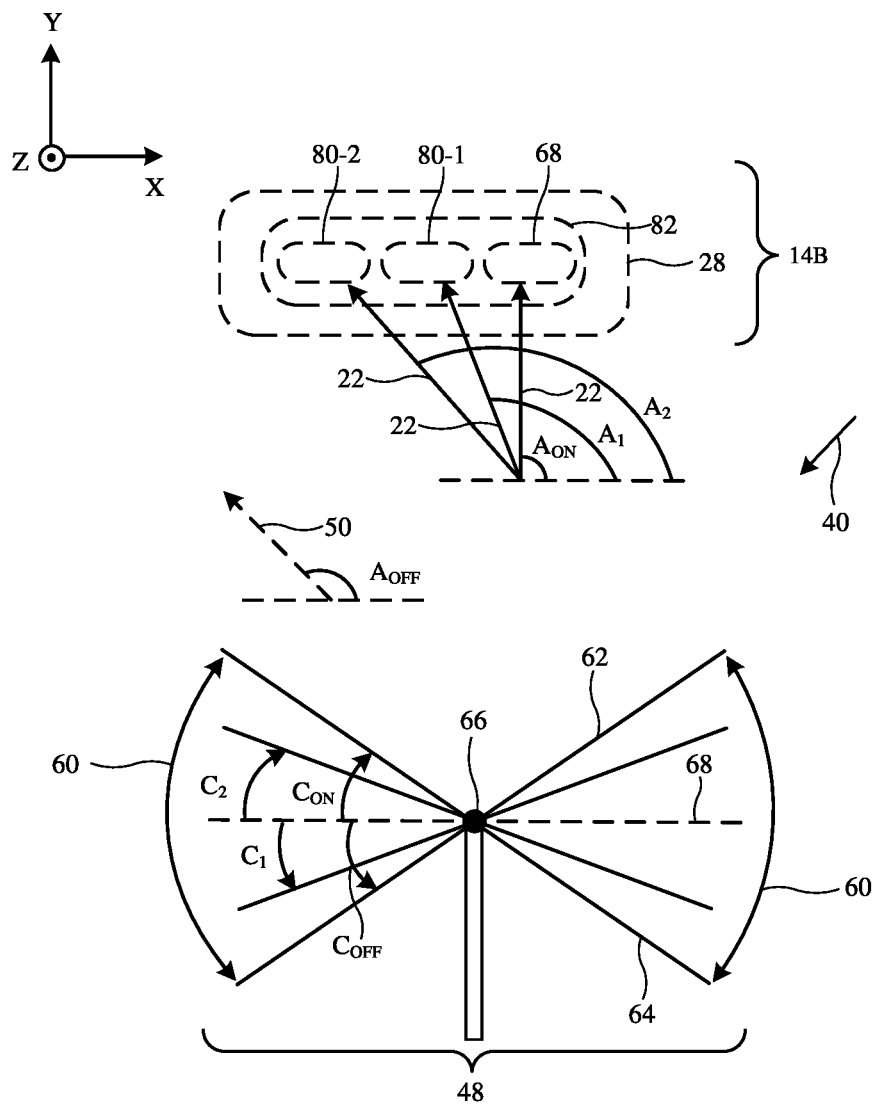
FIG. 6 is a schematic diagram of an illustrative reflective display panel mirror that shows how the reflective display panel mirror may have intermediate orientations that are used to reflect illumination light as the mirror transitions between ON and OFF states in accordance with some embodiments.

FIG. 6 is a diagram showing how mirror 48 may be used to reflect light towards input coupler 28 while mirror 48 is oriented at one or more intermediate tilt angles between tilt angles $C_{OFF}$ and $C_{ON}$ (e.g., as the mirror transitions between tilt angles $C_{OFF}$ and $C_{ON}$). As shown in FIG. 6, as mirror 48 rotates from tilt angle $C_{OFF}$ to tilt angle $C_{ON}$ (or vice versa), mirror 48 may have at least one intermediate tilt angle at which mirror 48 reflects illumination light 40 towards output coupler 28 as image light 22.

In the example of FIG. 6, mirror 48 may reflect illumination light 40 as image light 22 at output angle $A_1$ while oriented at tilt angle $C_2$ (e.g., where output angle $A_1$ is less than the output angle $A_{OFF}$ associated with tilt angle $C_{OFF}$ and greater than the output angle $A_{ON}$ associated with tilt angle $C_{ON}$). The image light 22 reflected by mirror 48 at tilt angle $C_2$ may be focused onto input coupler 28 (e.g., by lens 34 of FIG. 3) within a corresponding pupil 80-1. Pupil 80-1 may extend across a finite, non-zero area, and may be spatially offset from the pupil 68 associated with output angle $A_{ON}$. For example, pupil 80-1 may not overlap any of pupil 68 or may partially overlap pupil 68 (e.g., pupil 80-1 may be at least partially non-overlapping with respect to pupil 68).

Similarly, mirror 48 may reflect illumination light 40 as image light 22 at output angle $A_2$ while oriented at tilt angle $C_1$ (e.g., where tilt angle $C_1$ is less than tilt angle $C_{OFF}$ and greater than tilt angle $C_1$ and where output angle $A_2$ is greater than output angle $A_1$ and less than output angle $A_{OFF}$. The image light 22 reflected by mirror 48 at tilt angle $C_1$ may be focused onto input coupler 28 (e.g., by lens 34 of FIG. 3) within a corresponding pupil 80-2. Pupil 80-2 may extend across a finite, non-zero area, and may be spatially offset from pupil 80-1. For example, pupil 80-2 may not overlap any of pupil 80-1 or may partially overlap pupil 80-1 (e.g., pupil 80-2 may be at least partially non-overlapping with respect to pupil 80-1).

Collectively, pupils 68, 80-1, and 80-2 may form an effective pupil 82 that extends across a larger area than each individual pupil on its own. By rapidly toggling between tilt angles $C_{OFF}$ and $C_{ON}$ (e.g., faster than the response rate of the human eye such as at 24 Hz or greater, 30 Hz or greater, 60 Hz or greater, 120 Hz or greater, 240 Hz or greater, etc.), as shown by arrows 60, and also reflecting light while at intermediate tilt angles $C_1$ and $C_2$ during each transition between tilt angles $C_{OFF}$ and $C_{ON}$, mirror 48 may "paint" effective pupil 82 at input coupler 28 over time. Effective pupil 82 may then be used to display frames of image data at the eye box. This may serve to effectively expand the size of the pupil of light coupled into waveguide 26 by input coupler 28 (e.g., in one dimension such as the dimension parallel to the X-axis), thereby ensuring that as much of the eye box is filled with uniformly-distributed image light 22. By performing pupil expansion in this way using the mirrors 48 in DMD panel 46 (e.g., by leveraging non-zero transition time TX and reflecting light at intermediate tilt angles), other pupil-expanding components in display 14 such as cross-coupler 32 may be omitted. Omitting cross-coupler 32 may, for example, minimize the number of diffractions performed on image light 22 in directing the image light towards the eye box, thereby maximizing light throughput and the peak brightness of the images provided at the eye box.

The example of FIG. 6 is merely illustrative. Mirror 48 may reflect illumination light 40 at any desired number N of intermediate tilt angles during each transition between tilt angles $C_{OFF}$ and $C_{ON}$ (e.g., at one intermediate tilt angle, at two intermediate tilt angles as shown in FIG. 6, at three intermediate tilt angles, at four intermediate tilt angles, at more than four intermediate tilt angles, etc.). Each intermediate tilt angle that is used to reflect light may produce a corresponding pupil 80 that is used to pain the larger effective pupil 82 (e.g., mirror 48 may produce N+1 pupils at input coupler 28 over time, where N pupils 80 are produced at intermediate tilt angles and one pupil 68 is produced at tilt angle $C_{ON}$).

Figure 7:
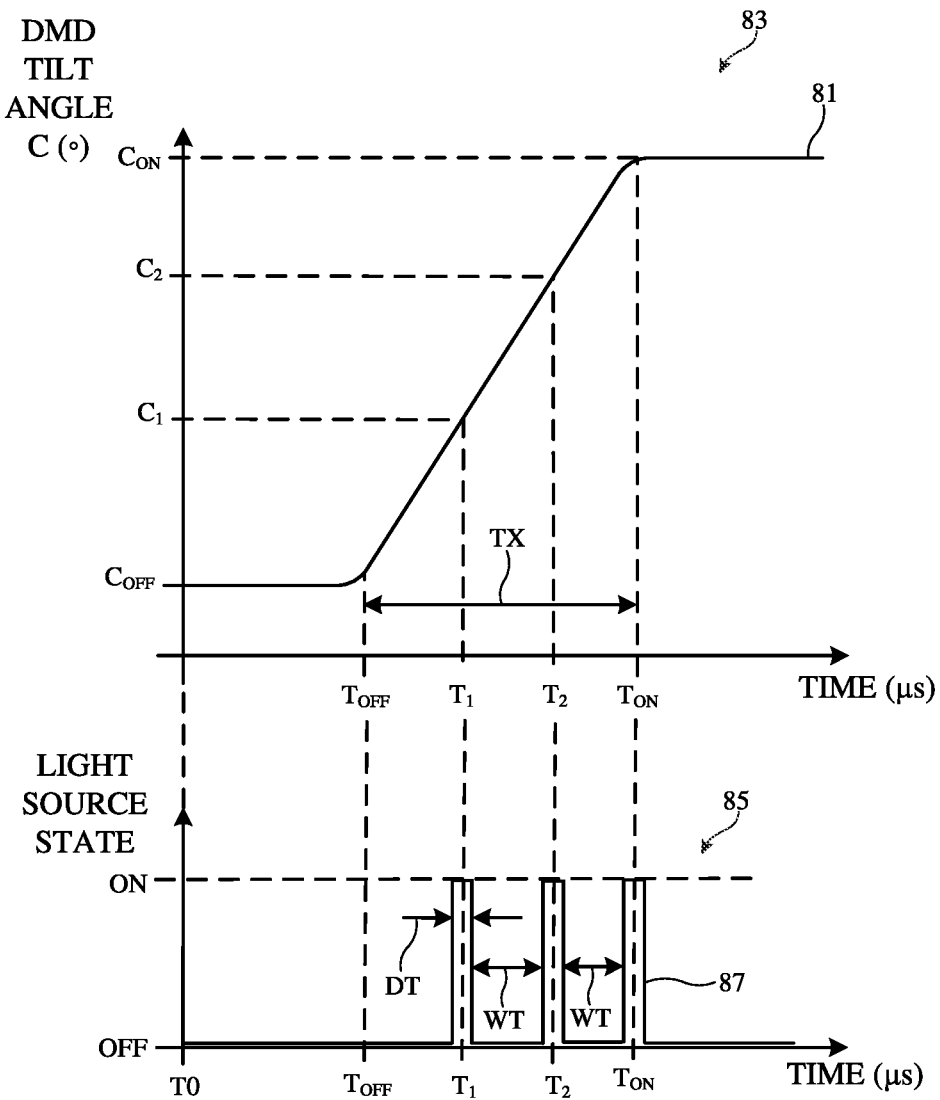
FIG. 7 includes graphs that show how an illustrative light source may be pulsed to provide image light to an input coupler while a reflective display panel mirror is at intermediate orientations as the mirror transitions between ON and OFF states in accordance with some embodiments.

Graph 83 of FIG. 7 plots the tilt angle C of mirror 48 as the mirror transitions from tilt angle $C_{OFF}$ to tilt angle $C_{ON}$ while also reflecting illumination light 40 at one or more intermediate tilt angles. As shown by curve 81 of graph 83, mirror 48 may be at tilt angle $C_{OFF}$ between time T0 and time $T_{OFF}$. At time $T_{OFF}$, control circuitry 16 (FIG. 1) may control mirror 48 to rotate to tilt angle $C_{ON}$. At and after time $T_{ON}$, mirror 48 may be at tilt angle $C_{ON}$. Between times $T_{OFF}$ and $T_{ON}$, mirror 48 may rotate through intermediate tilt angles that include intermediate tilt angle $C_1$ and intermediate tilt angle $C_2$, as mirror 48 rotates from tilt angle $C_{OFF}$ to tilt angle $C_{ON}$. For example, mirror 48 may be oriented at tilt angle $C_1$ at time $T_1$ and may be oriented at tilt angle $C_2$ at time $T_2$ (e.g., where times $T_1$ and $T_2$ are during transition time TX).

Graph 85 of FIG. 7 plots the state of light source 44 as mirror 48 transitions from tilt angle $C_{OFF}$ to tilt angle $C_{ON}$ while also reflecting illumination light 40 at one or more intermediate tilt angles. As shown by curve 87 of graph 85, light source 44 may be turned off until time $T_1$. At time $T_1$ (e.g., when mirror 48 is at intermediate tilt angle $C_1$), control circuitry 16 (FIG. 1) may control light source 44 (FIG. 3) to pulse "ON" (e.g., for pulse duration DT). Pulse duration DT may be, for example, 1 μs, 2 μs, 3 μs, 4 μs, 1-5 μs, 2-4 μs, less than 5 μs, less than 4 μs, less than 3 μs, less than 2 μs, less than 1 μs, or other durations. Pulsing light source 44 in this way may produce a pulse of illumination light 40 (FIG. 3) that is reflected off of mirror 48 while the mirror is at intermediate tilt angle $C_1$, providing image light 22 to input coupler 28 within pupil 80-2 (FIG. 6).

Similarly, at time $T_2$ (e.g., when mirror 48 is at intermediate tilt angle $C_2$), control circuitry 16 may control light source 44 to pulse "ON" (e.g., for pulse duration DT). Pulsing light source 44 at this time may produce a pulse of illumination light 40 (FIG. 3) that is reflected off of mirror 48 while the mirror is at intermediate tilt angle $C_2$, providing image light 22 to input coupler 28 within pupil 80-1 (FIG. 6). Then, at time $T_{ON}$ (e.g., when mirror 48 is at tilt angle $C_{ON}$), control circuitry 16 may control light source 44 to pulse "ON" (e.g., for pulse duration DT). Pulsing light source 44 at this time may produce a pulse of illumination light 40 (FIG. 3) that is reflected off of mirror 48 while the mirror is at tilt angle $C_{ON}$, providing image light 22 to input coupler 28 within pupil 68 (FIG. 6). Each pulse of light source 44 may be separated from the subsequent or previous pulse by pulse gap WT. Pulse gap WT may, for example, be longer than pulse duration DT.

The example of FIG. 7 is merely illustrative. Pulse gaps WT may be uniform across transition time TX or may be non-uniform across transition time TX (e.g., pulse gaps WT may be selected so that light source 44 is pulsed on while mirror 48 is at any desired intermediate tilt angle(s) between tilt angle $C_{OFF}$ and tilt angle $C_{ON}$). Each pulse may have the same pulse duration DT or different pulses may have different durations. The pulse of light source 44 at time $T_{ON}$ may be omitted if desired. Light source 44 may be pulsed "ON" any desired number of times during transition time TX (e.g., N times to produce N pupils 80 (FIG. 6) at N different intermediate tilt angles of mirror 48). While graph 81 and graph 85 of FIG. 7 plot the transition of mirror 48 from the "OFF" state to the "ON" state, similar graphs may also plot the transition of mirror 48 from the "ON" state to the "OFF" state (e.g., by reversing the time axes of graphs 70 and 72). Control circuitry 16 may toggle in both directions between the "ON" and "OFF" states over time (e.g., as shown by arrows 60 of FIG. 6). This may, for example, serve to paint an effective pupil 82 of image light 22 provided to input coupler 28 (FIG. 6).

Figure 8:
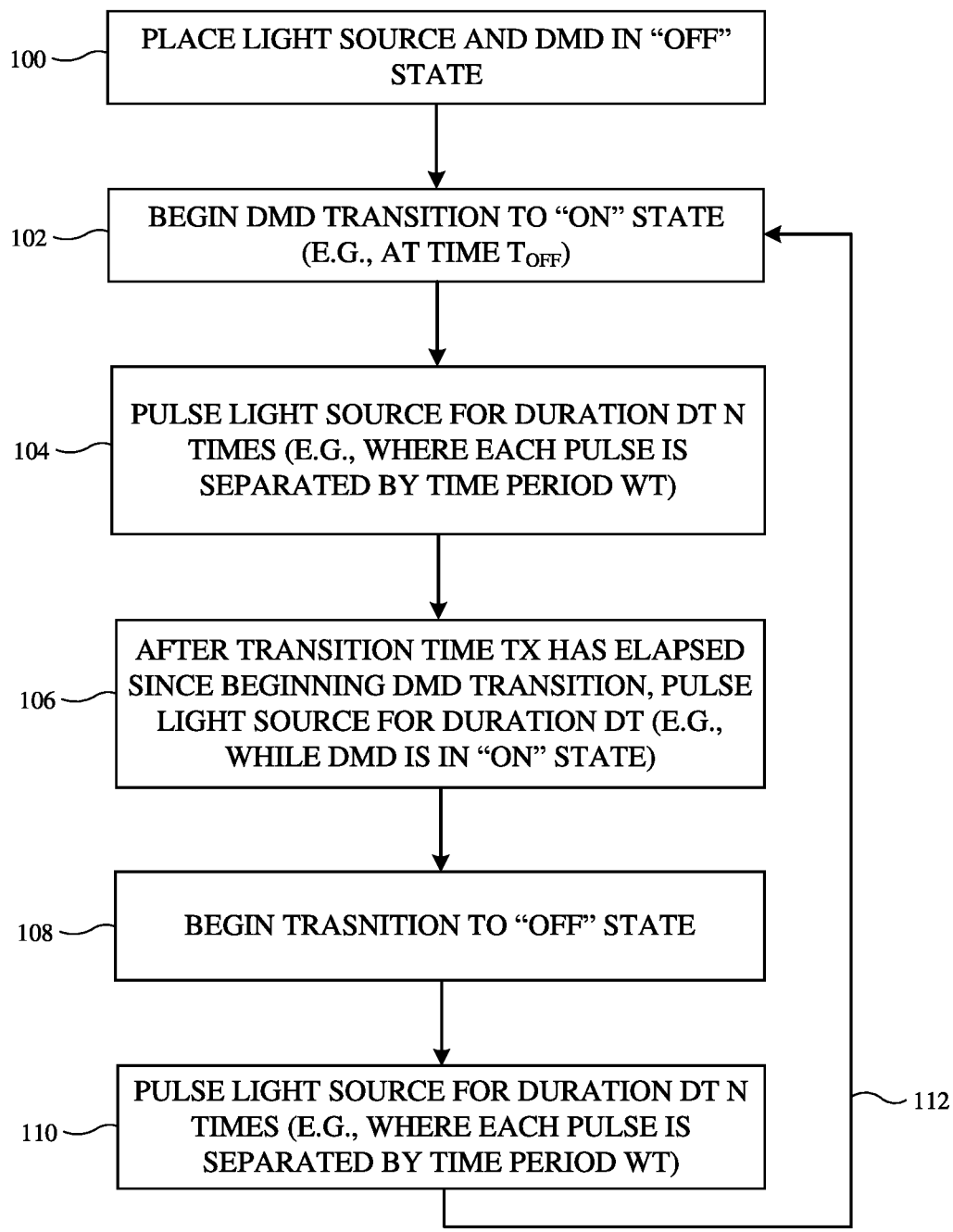
FIG. 8 is a flow chart of illustrative steps involved in providing image light to an input coupler with a reflective display panel mirror at intermediate orientations as the mirror transitions between ON and OFF states in accordance with some embodiments.

FIG. 8 is a flow chart of illustrative steps that may be performed by control circuitry 16 (FIG. 1) in controlling mirror 48 to reflect light using one or more intermediate tilt angles. At step 100, control circuitry 16 may place mirror 48 in the "OFF" state (e.g., where mirror 48 is oriented at tilt angle $C_{OFF}$). Control circuitry 16 may also place light source 44 in the "OFF" state (e.g., so light source 44 does not emit illumination light 40).

At step 102, control circuitry 16 may control mirror 48 to begin rotating from tilt angle $C_{OFF}$ to tilt angle $C_{ON}$. Mirror 48 may be oriented at intermediate tilt angles as the mirror rotates from tilt angle $C_{OFF}$ to tilt angle $C_{ON}$. Mirror 48 may take transition time TX to rotate from tilt angle $C_{OFF}$ to tilt angle $C_{ON}$.

At step 104, while mirror 48 is rotating from tilt angle $C_{OFF}$ to tilt angle $C_{ON}$ (e.g., without stopping the rotation of mirror 48), control circuitry 16 may perform N pulses of light source 44 for duration DT (e.g., where the pulses are separated in time by pulse gaps WT). The pulse timing may be selected so that offset pupils 80 of image light 22 (FIG. 6) are provided to input coupler 28 while mirror 48 is at a desired set of different intermediate tilt angles in its transition from tilt angle $C_{OFF}$ to tilt angle $C_{ON}$. For example, control circuitry 16 may pulse light source 44 "ON" at time $T_1$ (e.g., while mirror 48 is at tilt angle $C_1$) and again at time $T_2$ (e.g., at pulse gap WT after the previous pulse, while mirror 48 is at tilt angle $C_2$). This may serve to provide image light 22 to input coupler 28 within pupil 80-2 and then within pupil 80-1 of FIG. 6.

At step 106, after transition time TX has elapsed since beginning the transition of mirror 48 to tilt angle $C_{ON}$, control circuitry 16 may pulse light source 44 "ON" (e.g., at time $T_{ON}$).

At step 108, control circuitry 16 may then control mirror 48 to begin rotating back from tilt angle $C_{ON}$ to tilt angle $C_{OFF}$.

At step 110, while mirror 48 is rotating from tilt angle $C_{ON}$ to tilt angle $C_{OFF}$, control circuitry 16 may perform N pulses of light source 44 for duration DT (e.g., where the pulses are separated in time by pulse gaps WT). The pulse timing may be selected so that offset pupils 80 of image light 22 (FIG. 6) are provided to input coupler 28 while mirror 48 is at a desired set of different intermediate tilt angles in its transition from tilt angle $C_{ON}$ to tilt angle $C_{OFF}$. Processing may subsequently loop back to step 102 via path 112. Control circuitry 16 may continue to repeat these steps (e.g., where each transition between tilt angles $C_{ON}$ and $C_{OFF}$ occurs faster than the response time of the human eye) to provide an effective pupil 82 of light at input coupler 28 that is much larger than the individual pupil size that would otherwise be provided to the input coupler (e.g., as shown by pupil 68 of FIG. 4).

The example of FIG. 8 is merely illustrative. If desired, light source 44 may be pulsed ON only during the transition of mirror 48 from tilt angle $C_{OFF}$ to tilt angle $C_{ON}$ (e.g., steps 108 and 110 may be omitted and processing may loop back to step 102 after step 106) or light source 44 may be pulsed ON only during the transition of mirror 48 from tilt angle $C_{ON}$ to tilt angle $C_{OFF}$ (e.g., mirror 48 may be placed in the "ON" state at step 100, steps 102-106 may be omitted, and processing may loop back to step 100 from step 110). If desired, step 106 may be omitted (e.g., mirror 48 may provide image light to input coupler 28 only while oriented at intermediate tilt angles if desired). Two or more of the steps of FIG. 8 may be performed concurrently and/or combinations of these arrangements may be used if desired.

Figure 9:
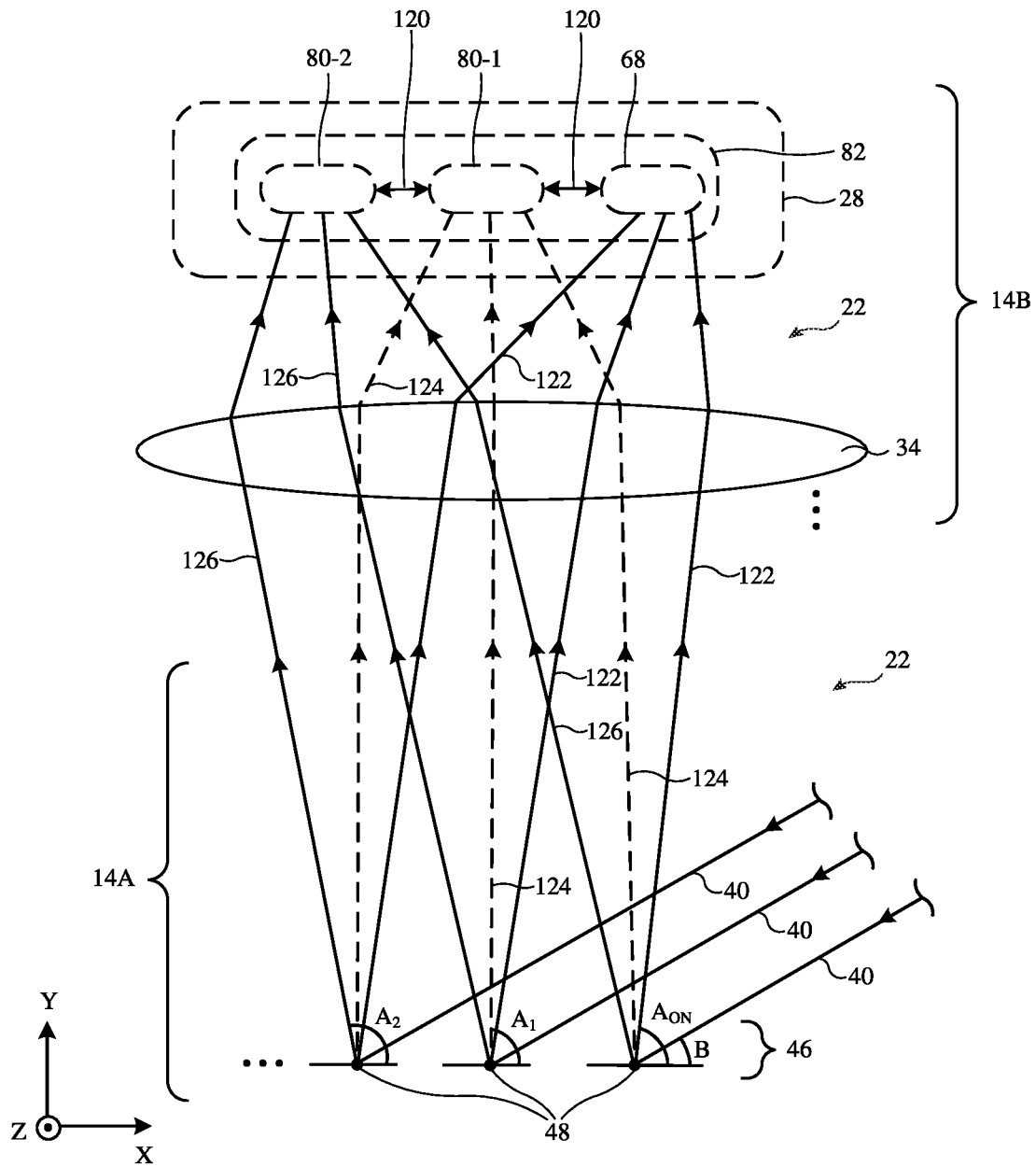
FIG. 9 is a top view showing how multiple reflective display panel mirrors may provide image light within different pupils at an input coupler as the mirrors transition between ON and OFF states in accordance with some embodiments.

In the example of FIGS. 3-7, the operation of a single mirror 48 is illustrated for the sake of clarity. In general, these operations may be performed for all of the mirrors across DMD panel 46 (FIG. 3). FIG. 9 is a diagram showing how three mirrors 48 in DMD panel 46 may be provide image light 22 to input coupler 28 while the mirrors transition between tilt angles $C_{OFF}$ and $C_{ON}$.

As shown in FIG. 9, three mirrors 48 (e.g., three adjacent mirrors in display panel 46) may receive illumination light 40 (e.g., at the same incident angle B and from the same light source 44 of FIG. 3). Control circuitry 16 (FIG. 1) may control these mirrors to transition between tilt angles $C_{OFF}$ and $C_{ON}$. At a first tilt angle (e.g., at intermediate tilt angle $C_1$ and time $T_1$ of FIG. 7), mirrors 48 may produce image light 22 by reflecting illumination light 40 onto output angle $A_2$, as shown by rays 126. Lens 34 (e.g., one or more lens elements in lens 34) may focus the image light 22 incident at angle $A_2$ to within pupil 80-2 on input coupler 28 of optical system 14B.

At a second tilt angle (e.g., at intermediate tilt angle $C_2$ and time $T_2$ of FIG. 7), mirrors 48 may produce image light 22 by reflecting illumination light 40 onto output angle $A_1$, as shown by rays 124. Lens 34 (e.g., one or more lens elements in lens 34) may focus the image light 22 incident at angle $A_1$ to within pupil 80-1 on input coupler 28 of optical system 14B.

At a third tilt angle (e.g., at tilt angle $C_{ON}$ and time $T_{ON}$ of FIG. 7), mirrors 48 may produce image light 22 by reflecting illumination light 40 onto output angle $A_{ON}$, as shown by rays 122. Lens 34 (e.g., one or more lens elements in lens 34) may focus the image light 22 incident at angle $A_{ON}$ to within pupil 68 on input coupler 28 of optical system 14B. Pupil 80-2 may be at least partially non-overlapping with respect to pupil 80-1. Pupil 80-1 may be at least partially non-overlapping with respect to pupil 68. By rapidly toggling the tilt angle of mirrors 48, pupils 80-2, 80-1, and 68 may collectively form the one-dimensionally expanded effective pupil 82 at input coupler 28. The same light source 44 and the same illumination light 40 may be used to produce image light 22 for each of the mirrors 48 in DMD panel 46 regardless of which tilt angle is being used by the mirrors to reflect illumination light 40 (e.g., the N pupils 80 and pupil 68 of image light 22 may be produced by the same light source 44, the same illumination light 44, and the same mirrors 48 of the same DMD panel 46).

The example of FIG. 9 is merely illustrative. Mirrors 48 may reflect illumination light 40 at any desired number N of intermediate tilt angles during each transition between tilt angles $C_{OFF}$ and $C_{ON}$ (e.g., at one intermediate tilt angle, at two intermediate tilt angles as shown in FIG. 6, at three intermediate tilt angles, at four intermediate tilt angles, at more than four intermediate tilt angles, etc.). Each intermediate tilt angle that is used to reflect light may produce a corresponding pupil 80 that is used to paint the larger effective pupil 82 (e.g., mirrors 48 may produce N+1 pupils at input coupler 28 over time, where N pupils 80 are produced at intermediate tilt angles and one pupil 68 is produced at tilt angle $C_{ON}$).

The examples described above in which pupils 80-2, 80-1, and 68 are used to perform one-dimensional pupil expansion are merely illustrative. In another suitable arrangement, pupils 80-2, 80-1, and 68 may be used to provide image light 22 with different optical powers and/or to produce virtual objects in different focal planes at eye box 24 (FIG. 2). In these arrangements, pupil 80-2 may be separated from pupil 80-1 by a non-zero offset 120 and pupil 80-1 may be separated from pupil 68 by a non-zero offset 120. The same offset 120 or different offsets 120 may be used between each of the pupils. Each pupil may then be received by different input coupling structures on waveguide 26.

Figure 10:
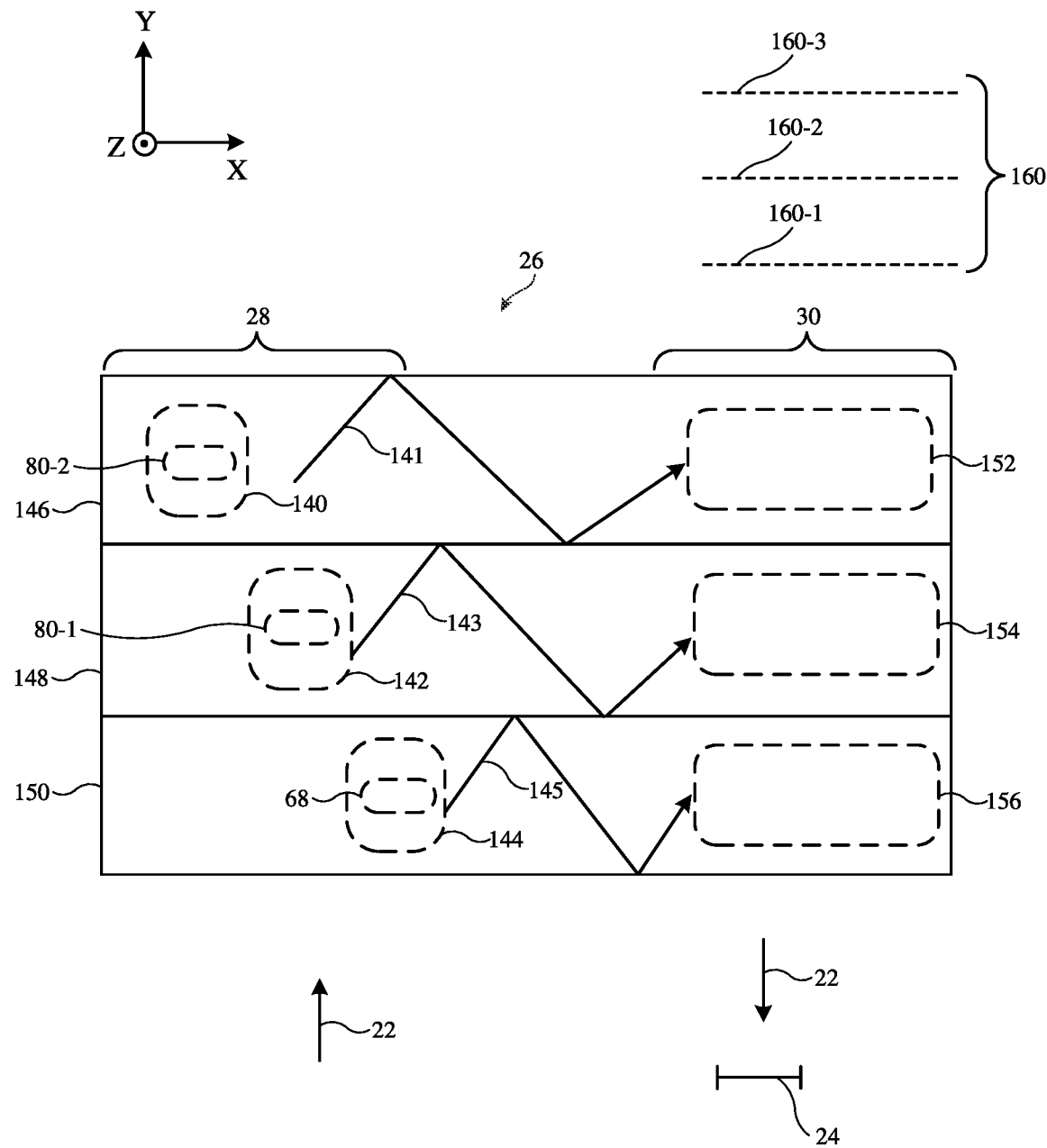
FIG. 10 is a top view of an illustrative waveguide having multiple input coupling structures for providing images at an eye box with virtual objects in multiple focal planes in accordance with some embodiments.

FIG. 10 is a top view showing how mirrors 48 may be used to provide image light with different optical powers and/or in different focal planes to eye box 24 (FIG. 2). As shown in FIG. 10, waveguide 26 may include a first waveguide portion (layer) 150, a second waveguide portion (layer) 148 stacked onto first waveguide portion 150, and a third waveguide portion (layer) 146 stacked onto second waveguide portion 148. Each of waveguide portions 150, 148, and 146 may include one, two, or more than two substantially planar waveguide substrates and a layer of grating medium (e.g., a layer of holographic recording medium layered onto one waveguide substrate or sandwiched (interposed) between two waveguide substrates).

Input coupler 28 may include a first input coupling structure 144 in waveguide portion 150, a second input coupling structure 142 in waveguide portion 148, and a third input coupling structure 140 in waveguide portion 146. Input coupling structure 144 may include a diffractive grating structure (e.g., a set of volume holograms) or a louvered mirror formed in the layer of grating medium in waveguide portion 150. Input coupling structure 142 may include a diffractive grating structure (e.g., a set of volume holograms) or a louvered mirror formed in the layer of grating medium in waveguide portion 148. Input coupling structure 140 may include a diffractive grating structure (e.g., a set of volume holograms) or a louvered mirror formed in the layer of grating medium in waveguide portion 146.

Output coupler 30 may include a first output coupling structure 156 in waveguide portion 150, a second output coupling structure 154 in waveguide portion 148, and a third output coupling structure 152 in waveguide portion 146. Output coupling structure 156 may include a diffractive grating structure (e.g., a set of volume holograms) or a louvered mirror formed in the layer of grating medium in waveguide portion 150. Output coupling structure 154 may include a diffractive grating structure (e.g., a set of volume holograms) or a louvered mirror formed in the layer of grating medium in waveguide portion 148. Output coupling structure 152 may include a diffractive grating structure (e.g., a set of volume holograms) or a louvered mirror formed in the layer of grating medium in waveguide portion 146.

Input coupling structure 144 may be completely or partially non-overlapping with respect to input coupling structures 142 and 140. Input coupling structure 142 may be completely or partially non-overlapping with respect to input coupling structures 140 and 144. Lens 34 (FIG. 9) may focus the pupil 80-2 of image light 22 onto input coupling structure 140 of waveguide layer 146. Lens 34 may focus the pupil 80-1 of image light 22 onto input coupling structure 142 of waveguide layer 148. Lens 34 may focus the pupil 68 of image light 22 onto input coupling structure 142 of waveguide layer 148.

Input coupling structure 140 may redirect the image light 22 incident within pupil 80-2 towards output coupling structure 152 and the redirected image light may propagate down waveguide portion 146 via total internal reflection, as shown by arrow 141. Input coupling structure 142 may redirect the image light 22 incident within pupil 80-1 towards output coupling structure 154 and the redirected image light may propagate down waveguide portion 148 via total internal reflection, as shown by arrow 143. Input coupling structure 144 may redirect the image light 22 incident within pupil 68 towards output coupling structure 156 and the redirected image light may propagate down waveguide portion 150 via total internal reflection, as shown by arrow 145. In scenarios where input coupling structures 140, 142, and 144 are formed using diffractive grating structures, the diffractive grating structure in input coupling structure 140 may be Bragg-matched with the wavelengths and incident angles associated with pupil 80-2, the diffractive grating structure in input coupling structure 142 may be Bragg-matched with the wavelengths and incident angles associated with pupil 80-1, and the diffractive grating structure in input coupling structure 144 may be Bragg-matched with the wavelengths and incident angles associated with pupil 68.

Output coupler 30 may couple the image light 22 received from input coupler 28 out of waveguide 26 and towards eye box 24. Output coupling structure 152 may couple the image light associated with arrow 141 out of waveguide 26 and towards eye box 24. Output coupling structure 154 may couple the image light associated with arrow 143 out of waveguide 26 and towards eye box 24. Output coupling structure 156 may couple the image light associated with arrow 145 out of waveguide 26 and towards eye box 24.

In coupling the image light associated with arrow 141 out of waveguide 26, output coupling structure 152 may impart the image light with a first optical power (e.g., a positive or negative lens power) and/or may provide the image light to eye box 24 such that objects in the image light are provided in a first image (focal) plane 160-1 (e.g., the holograms used to form output coupling structure 152 may have a finite focal length rather than being plane-to-plane holograms). Additionally or alternatively, if desired, waveguide portion 146 may be curved and/or a lens may be interposed between waveguide portions 146 and 148 to impart the image light associated with arrow 141 with the first optical power and/or to provide the image light to eye box 24 such that objects in the image light are provided in first image plane 160-1. If desired, input coupling structure 140 may impart optical power to the image light associated with arrow 141.

In coupling the image light associated with arrow 143 out of waveguide 26, output coupling structure 154 may impart the image light with a second optical power (e.g., an optical power that is different from the first optical power) and/or may provide the image light to eye box 24 such that objects in the image light are provided in a second image (focal) plane 160-2 (e.g., the holograms used to form output coupling structure 154 may have a finite focal length rather than being plane-to-plane holograms). Additionally or alternatively, if desired, waveguide portion 148 may be curved and/or a lens may be interposed between waveguide portions 148 and 150 to impart the image light associated with arrow 143 with the second optical power and/or to provide the image light to eye box 24 such that objects in the image light are provided in second image plane 160-2. If desired, input coupling structure 142 may impart optical power to the image light associated with arrow 143.

In coupling the image light associated with arrow 145 out of waveguide 26, output coupling structure 156 may impart the image light with a third optical power (e.g., an optical power that is different from the first and second optical powers) and/or may provide the image light to eye box 24 such that objects in the image light are provided in a third image (focal) plane 160-3 (e.g., the holograms used to form output coupling structure 154 may have a finite focal length rather than being plane-to-plane holograms). Additionally or alternatively, if desired, waveguide portion 150 may be curved and/or a lens may be interposed between waveguide portion 150 and eye box 24 to impart the image light associated with arrow 145 with the third optical power and/or to provide the image light to eye box 24 such that objects in the image light are provided in second image plane 160-3. If desired, input coupling structure 144 may impart optical power to the image light associated with arrow 145.

When configured in this way, waveguide 26 may be configured to display different images from display module 14A in different image (focal) planes 160 (e.g., virtual image locations at different respective distances from eye box 24). This allows distant objects (e.g., mountain peaks in a landscape) to be presented in a distant image plane 160 (see, e.g., far-field image plane 160-3) and allows close objects (e.g., the face of a person in the user's field of view) to be presented in a close image plane (see, e.g., near-field image plane 160-1), providing eye box 24 with three-dimensional image content. Other objects may be presented in intermediate-distance image planes (e.g., intermediate image plane 160-2). By displaying far objects in distant image planes and close objects in nearby image planes, three-dimensional imagery may be displayed naturally for the user with minimal eye fatigue and discomfort.

When configured in this way, display module 14A may provide waveguide 26 with multiple images per unit time (e.g., per "frame" of image data). These images may be presented in multiple different focal planes 160. Display module 14A may present multiple images to a user through waveguide 26 using a multiplexing scheme (e.g., in which the image light associated with arrows 141, 143, and 145 are provided to eye box 24 at different times as mirrors 48 transition between "ON" and "OFF" states).

The example of FIG. 10 is merely illustrative. In general, there may be N input coupling structures in input coupler 28 and N output coupling structures in output coupler 30, where each of the N input coupling structures couples the image light 22 from a respective pupil into a respective waveguide portion (e.g., there may be N stacked waveguide portions in waveguide 26, each with a respective input coupling structure and output coupling structure). Similarly, image light 22 may be provided to eye box 24 with N optical powers and/or with virtual objects in N different focal planes 160. Waveguide portions 146, 148, and 150 may sometimes be referred to as separate waveguides rather than as portions of the same waveguide 26.

Input coupling structures 140, 142, and/or 144 be overlapping (e.g., completely overlapping) if desired. In this arrangement, because the diffractive grating structure in input coupling structure 144 is Bragg-matched to the image light 22 incident within pupil 68, the image light 22 incident within pupils 80-2 and 80-1 may pass through input coupling structure 144 to input coupling structures 142 and 144 without being diffracted in waveguide portion 150. Similarly, because the diffractive grating structure in input coupling structure 142 is Bragg-matched to the image light 22 incident within pupil 80-1, the image light 22 incident within pupil 80-2 may pass through input coupling structure 144 to input coupling structure 140 without being diffracted in waveguide portion 148.

If desired, two or more of the input coupling structures (e.g., each of input coupling structures 140, 142, and 144) may be formed in the same waveguide portion (e.g., from different sets of overlapping holograms recorded in the same volume of the same layer of grating medium). In this example, the set of holograms in input coupling structure 140 may only diffract the image light 22 incident within pupil 80-2, the set of holograms in input coupling structure 142 may only diffract the image light 22 incident within pupil 80-1, and the set of holograms in input coupling structure 144 may only diffract the image light 22 incident within pupil 68. By toggling mirrors 48 between tilt angles $C_{OFF}$ and $C_{ON}$ and pulsing light source 44 while mirror 48 is at one or more intermediate tilt angles, display 14 may provide image light 22 to eye box 24 with different optical powers and/or with virtual objects in different focal planes over time. By toggling the tilt angles faster than the response time of the human eye, the image light 22 received at eye box 24 may appear to the human eye to have been provided concurrently with each of the optical powers and with virtual objects in each of the different focal places at once.

The foregoing is merely illustrative and various modifications can be made to the described embodiments. The foregoing embodiments may be implemented individually or in any combination.

What is claimed is:

1. A display system comprising:
    a light source configured to emit illumination light;
    a reflective display panel configured to reflect the illumination light as image light, wherein the reflective display panel comprises a plurality of mirrors, a mirror from the plurality of mirrors is adjustable between an off state and an on state, the mirror is oriented at first tilt angle in the off state, and the mirror is oriented at a second tilt angle that is different from the first tilt angle in the on state;
    a waveguide having an input coupler configured to couple the image light into the waveguide and having an output coupler configured to couple the image light out of the waveguide and towards an eye box; and
    control circuitry coupled to the reflective display panel, wherein the control circuitry is configured to:
        rotate the mirror from the first tilt angle to the second tilt angle, and
        pulse the light source while the mirror is rotating from the first tilt angle to the second tilt angle.

2. The display system of claim 1, wherein the reflective display panel comprises a digital-micromirror device (DMD) and wherein the mirror comprises a micromirror.

3. The display system of claim 1, further comprising:
    at least one lens element, wherein the at least one lens element is configured to provide the illumination light to each mirror of the plurality of mirrors at a common angle of incidence.

4. The display system of claim 1, wherein the control circuitry is configured to pulse the light source while the mirror is at an intermediate tilt angle that is between the first tilt angle and the second tilt angle.

5. The display system of claim 4, wherein the control circuitry is configured to pulse the light source while the mirror is at the second tilt angle.

6. The display system of claim 5, wherein the mirror is configured to provide the image light to the input coupler within a first pupil while the mirror is at the intermediate tilt angle, wherein the mirror is configured to provide the image light to the input coupler within a second pupil while the mirror is at the second tilt angle, and wherein the second pupil is at least partially non-overlapping with respect to the first tilt angle.

7. The display system of claim 6, wherein the first and second pupils collectively form an expanded pupil that is larger than the first pupil and that is larger than the second pupil.

8. The display system of claim 6, wherein the waveguide comprises first and second layers of grating medium, wherein the input coupler comprises a first input coupling structure in the first layer of grating medium and a second input coupling structure in the second layer of grating medium, and wherein the display system further comprises:
at least one lens element that is configured to focus the first pupil on the first input coupling structure and that is configured to focus the second pupil on the second input coupling structure.

9. The display system of claim 8, wherein the output coupler comprises a first output coupling structure in the first layer of grating medium and a second output coupling structure in the second layer of grating medium, wherein the first output coupling structure is configured to couple the image light out of the waveguide and towards the eye box with a first optical power, and wherein the second output coupling structure is configured to couple the image light out of the waveguide and towards the eye box with a second optical power that is different from the first optical power.

10. The display system of claim 4, wherein the control circuitry is configured to pulse the light source while the mirror is at an additional intermediate tilt angle that is between the intermediate tilt angle and the second tilt angle.

11. The display system of claim 10, wherein the mirror is configured to provide the image light to the input coupler within a first pupil while the mirror is at the intermediate tilt angle, wherein the mirror is configured to provide the image light to the input coupler within a second pupil while the mirror is at the additional intermediate tilt angle, and wherein the second pupil is at least partially non-overlapping with respect to the first tilt angle.

12. The display system of claim 11, wherein the first and second pupils collectively form an expanded pupil that is larger than the first pupil and that is larger than the second pupil.

13. The display system of claim 11, wherein the waveguide comprises first and second layers of grating medium, wherein the input coupler comprises a first diffractive grating structure in the first layer of grating medium and a second diffractive grating structure in the second layer of grating medium, wherein the first diffractive grating structure is Bragg-matched to the first pupil, and wherein the second diffractive grating structure is Bragg-matched to the second pupil.

14. The display system of claim 13, wherein the output coupler comprises a first output coupling structure in the first layer of grating medium and a second output coupling structure in the second layer of grating medium, wherein the first output coupling structure is configured to couple a first portion of the image light having a first virtual object in a first focal plane out of the waveguide and towards the eye box, and wherein the second output coupling structure is configured to couple a second portion of the image light having a second virtual object in a second focal plane that is different from the first focal plane out of the waveguide.

15. The display system of claim 1, wherein the control circuitry is further configured to:
rotate the mirror from the second tilt angle to the first tilt angle, and
pulse the light source while the mirror is rotating from the second tilt angle to the first tilt angle.

16. The display system of claim 15, wherein the control circuitry is further configured to:
toggle the mirror between the first and second tilt angles at a rate greater than or equal to 24 Hz.

17. A method of operating a display system to provide image light to an eye box, wherein the display system comprises a light source, a digital-micromirror device (DMD) panel, control circuitry, and a waveguide having an input coupler and an output coupler, wherein the DMD panel comprises a micromirror that is adjustable between a first tilt angle and a second tilt angle, and wherein the method comprises:
with the control circuitry, adjusting the micromirror from the first tilt angle to the second tilt angle, wherein the micromirror takes a non-zero time period to transition from the first tilt angle to the second tilt angle;
with the control circuitry, during the non-zero time period, controlling the light source to emit at least one pulse of illumination light;
with the micromirror, during the non-zero time period, reflecting the at least one pulse of illumination light as image light;
with the input coupler, coupling the image light into the waveguide; and
with the output coupler, coupling the image light out of the waveguide and towards the eye box.

18. The method of claim 17, further comprising:
with the control circuitry, adjusting the micromirror from the second tilt angle to the first tilt angle, wherein the micromirror takes an additional non-zero time period to transition from the second tilt angle to the first tilt angle; and
with the control circuitry, during the additional non-zero time period, controlling the light source to emit at least one additional pulse of illumination light.

19. The method of claim 18, further comprising:
with the control circuitry, toggling the micromirror between the first and second tilt angles at a rate greater than or equal to 30 Hz.

20. The method of claim 17, wherein the at least one pulse of illumination light comprises a plurality of pulses of the illumination light and wherein reflecting the at least one pulse of illumination light comprises reflecting, at different respective intermediate tilt angles between the first and second tilt angles, each of the pulses from the plurality of pulses of the illumination light as the image light.

21. The method of claim 20, wherein the plurality of pulses comprises first and second pulses and wherein the different respective intermediate tilt angles comprise a first intermediate tilt angle at which the micromirror reflects the first pulse within a first pupil and a second intermediate tilt angle at which the micromirror reflects the second pulse within a second pupil that is at least partially non-overlapping with respect to the first pupil.

22. The method of claim 21, wherein coupling the image light out of the waveguide and towards the eye box comprises coupling the first pupil out of the waveguide with a first optical power and coupling the second pupil out of the waveguide with a second optical power that is different from the first optical power.

23. A display system comprising:
a light source;
a digital-micromirror device (DMD) panel that comprises a micromirror rotatable between a first tilt angle and a second tilt angle;
control circuitry coupled to the DMD panel, wherein the control circuitry is configured to:
control the micromirror to rotate from the first tilt angle to the second tilt angle, and
control the light source to emit first and second pulses of illumination light while the micromirror is rotating from the first tilt angle to the second tilt angle, wherein the micromirror is configured to reflect the first pulse of illumination light at a first output angle as first image light, wherein the micromirror is configured to reflect the second pulse of illumination light at a second output angle as second image light, and wherein the second output angle is different from the first output angle; and a waveguide, wherein the waveguide has an input coupler configured to couple the first and second image light into the waveguide and wherein the waveguide has an output coupler configured to couple the first and second image light out of the waveguide and towards an eye box.

24. The display system of claim 23, wherein the DMD panel comprises an additional micromirror rotatable between the first tilt angle and the second tilt angle, wherein the control circuitry is further configured to:

control the additional micromirror to rotate from the first tilt angle to the second tilt angle, wherein the additional micromirror is configured to reflect the first pulse of illumination light at the first output angle as a part of the first image light, and wherein the additional micromirror is configured to reflect the second pulse of illumination light at the second output angle as part of the second image light.

25. The display system of claim 24, further comprising:
a lens configured to focus the first image light onto the input coupler within a first pupil and configured to focus the second image light onto the input coupler within a second pupil that is at least partially offset with respect to the first pupil.

26. The display system of claim 25, wherein the control circuitry is configured to toggle the micromirror and the additional micromirror between the first and second tilt angles at a rate greater than or equal to 60 Hz.

27. The display system of claim 25, wherein the waveguide comprises:

a first waveguide portion, wherein the input coupler comprises a first input coupling structure in the first waveguide portion, the first input coupling structure being configured to redirect the first image light towards the output coupler via the first waveguide portion; and a second waveguide portion stacked onto the first waveguide portion, wherein the input coupler comprises a second input coupling structure in the second waveguide portion, the second input coupling structure being configured to redirect the second image light towards the output coupler via the second waveguide portion.

28. The display system of claim 27, wherein the output coupler comprises;

a first diffractive grating structure in the first waveguide portion, wherein the first diffractive grating structure is configured to couple the first image light out of the waveguide and towards the eye box; and a second diffractive grating structure in the second waveguide portion, wherein the second diffractive grating structure is configured to couple the second image light out of the waveguide and towards the eye box.

* * * * *